(12) United States Patent
Yoshida et al.

(10) Patent No.: US 12,714,967 B2
(45) Date of Patent: Aug. 25, 2026

(54) CARBON DIOXIDE RECOVERY SYSTEM

(71) Applicant: MITSUBISHI HEAVY INDUSTRIES, LTD., Tokyo (JP)

(72) Inventors: Kaori Yoshida, Kanagawa (JP); Shinya Tachibana, Kanagawa (JP); Tadashi Katsume, Kanagawa (JP); Takahito Yonekawa, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 291 days.

(21) Appl. No.: 18/716,016

(22) PCT Filed: Dec. 21, 2022

(86) PCT No.: PCT/JP2022/047025
§ 371 (c)(1),
(2) Date: Jun. 3, 2024

(87) PCT Pub. No.: WO2023/136065
PCT Pub. Date: Jul. 20, 2023

(65) Prior Publication Data

US 2026/0166476 A1 Jun. 18, 2026

(30) Foreign Application Priority Data

Jan. 14, 2022 (JP) ................................ 2022-004449

(51) Int. Cl.
*B01D 53/18* (2006.01)
*B01D 53/14* (2006.01)
(Continued)

(52) U.S. Cl.
CPC ......... *B01D 53/18* (2013.01); *B01D 53/1425* (2013.01); *B01D 53/343* (2013.01);
(Continued)

(58) Field of Classification Search
None
See application file for complete search history.

(56) References Cited

U.S. PATENT DOCUMENTS

2009/0211446 A1* 8/2009 Rochelle ............ B01D 53/1493 252/189
2013/0139695 A1* 6/2013 Chang ................ B01D 53/1481 96/235
(Continued)

FOREIGN PATENT DOCUMENTS

JP 2017132733 A * 8/2017
JP 2018168205 A * 11/2018
(Continued)

OTHER PUBLICATIONS

Machine translation of JP-2017132733-A (Year: 2017).*
(Continued)

*Primary Examiner* — Robert Clemente
(74) *Attorney, Agent, or Firm* — Osha Bergman Watanabe & Burton LLP

(57) ABSTRACT

A carbon dioxide recovery system includes a distillation column for heating an absorption solution having carbon dioxide absorbed therein to cause the carbon dioxide to be released from the absorption solution, a first reboiler that causes heat exchange to occur between a heating medium and the absorption solution extracted from the distillation column, a methanation device that includes a reactor for producing methane by causing a reaction between carbon dioxide and hydrogen, a reaction gas supply line for supplying the reaction gas flowed out from the reactor, to the first reboiler, as a heating medium, and a reaction gas return line for returning, to the methanation device, the reaction gas that had exchanged heat with the absorption solution in the first reboiler.

12 Claims, 5 Drawing Sheets

(51) Int. Cl.
*B01D 53/34* (2006.01)
*B01D 53/62* (2006.01)
*B01D 53/78* (2006.01)

(52) U.S. Cl.
CPC ............. *B01D 53/62* (2013.01); *B01D 53/78* (2013.01); *B01D 2252/204* (2013.01)

(56) References Cited

U.S. PATENT DOCUMENTS

| | | | | |
|---|---|---|---|---|
| 2013/0206010 | A1* | 8/2013 | Iijima | B01D 53/1425 96/242 |
| 2014/0017622 | A1* | 1/2014 | Chen | B01D 19/0005 432/29 |
| 2015/0231561 | A1* | 8/2015 | Reardon | B01D 53/84 435/266 |
| 2018/0280867 | A1* | 10/2018 | Tanaka | B01D 53/1462 |

FOREIGN PATENT DOCUMENTS

| | | | | |
|---|---|---|---|---|
| JP | 2019172595 A | * | 10/2019 | |
| JP | 2020-063206 A | | 4/2020 | |
| JP | 6820639 B1 | * | 1/2021 | F02C 6/00 |
| WO | WO-2021015056 A1 | * | 1/2021 | B01D 53/62 |

OTHER PUBLICATIONS

Machine translation of JP-2018168205-A (Year: 2018).*
Machine translation of JP-2019172595-A (Year: 2019).*
Machine translation of WO-2021015056-A1 (Year: 2021).*
Machine translation of JP-6820639-B1 (Year: 2021).*

* cited by examiner 1
2
3
4
5a
6
6a
6b
6C
6d
7
8
9
20
20a
20b
21
21b
22
22b
23
24
25
25b
26
26b
27
30
31
32
33

1
2
3
4
4a
4b
5a
5b
6
6a
6b
6C
6d
7
8
9
20
20a
20b
21
21b
22
22b
23
23
24
25
25b
26
26b
27

1
2
3
4
5a
6
6a
6b
6C
6d
7
8
9
20
20a
20b
21
21b
22
22b
23
24
25
25b
26
26b
27
28
30
31
32
33

1
2
3
4
5a
6
6a
6b
6C
6d
7
8
9
20
20a
20b
21
21b
22
22b
23
24
25
25b
26
26b
27
30
31
32
33
40
41
42

1
25
27
53
51
54
55
52
3
4c(4)
2
6s
6b
6d
6C
6
5a
4
33
24

CARBON DIOXIDE RECOVERY SYSTEM

TECHNICAL FIELD

The present disclosure relates to a carbon dioxide recovery system.

The present application claims priority based on Japanese Patent Application No. 2022-004449 filed in Japan on Jan. 14, 2022, the contents of which are incorporated herein by reference.

BACKGROUND ART

PTL 1 discloses an invention in which reaction heat of a reaction for producing methane from carbon dioxide and hydrogen is used as thermal energy to separate carbon dioxide from an adsorbent that has adsorbed the carbon dioxide.

CITATION LIST

Patent Literature

[PTL 1] Japanese Unexamined Patent Application Publication No. 2020-63206

SUMMARY OF INVENTION

Technical Problem

However, since the thermal energy used in PTL 1 is used through steam produced by the reaction heat, it cannot be said that the thermal energy is efficiently used.

In view of the above circumstances, at least one embodiment of the present disclosure has an object to provide a carbon dioxide recovery system improved in thermal efficiency of releasing carbon dioxide from an absorption liquid that has absorbed the carbon dioxide.

Solution to Problem

In order to achieve the above object, a carbon dioxide recovery system according to the present disclosure includes: a distillation column that heats an absorption liquid that has absorbed carbon dioxide to release the carbon dioxide from the absorption liquid; a first reboiler that exchanges heat between the absorption liquid extracted from the distillation column and a heat medium; a methanation device including a reactor that produces methane by causing the carbon dioxide and hydrogen to react with each other; a reaction gas supply line that Supplies a reaction gas flowing out of the reactor to the first reboiler as the heat medium; and a reaction gas return line that returns the reaction gas, which has exchanged heat with the absorption liquid in the first reboiler, to the methanation device.

Advantageous Effects of Invention

According to the carbon dioxide recovery system of the present disclosure, the absorption liquid is heated by exchanging heat between the reaction gas flowing out of the reactor that produces methane by causing carbon dioxide and hydrogen to react with each other and the absorption liquid that has absorbed the carbon dioxide. Therefore, it is possible to improve the thermal efficiency of releasing the carbon dioxide from the absorption liquid.

DESCRIPTION OF EMBODIMENTS

Hereinafter, a carbon dioxide recovery system according to embodiments of the present disclosure will be described with reference to the drawings. The embodiments which will be described below show aspects of the present disclosure and do not limit the disclosure, and any change can be made within the scope of the technical idea of the present disclosure.

Embodiment 1

<Configuration of Carbon Dioxide Recovery System According to Embodiment 1 of Present Disclosure>

Figure 1:
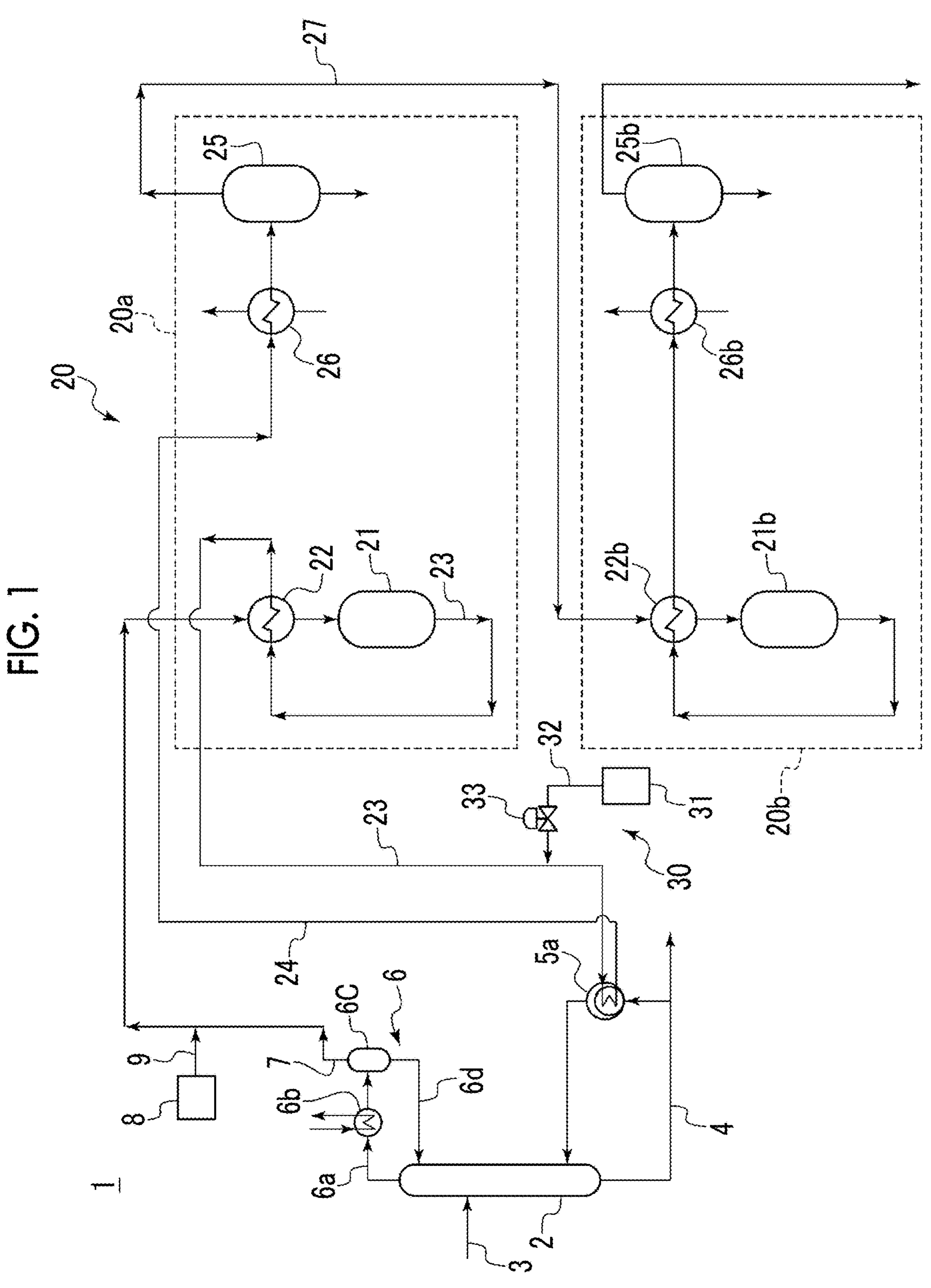
FIG. 1 is a schematic configuration diagram of a carbon dioxide recovery system s according to Embodiment 1 of the present disclosure.

As shown in FIG. 1, a carbon dioxide recovery system 1 according to Embodiment 1 of the present disclosure is configured by combining a distillation column 2 and a methanation device 20 that produces methane by causing carbon dioxide and hydrogen to react with each other. The distillation column 2 communicates with, for example, an absorption column (not shown) for absorbing carbon dioxide into an absorption liquid by bringing a gas containing carbon dioxide into gas-liquid contact with the absorption liquid via an absorption liquid line 3.

The distillation column 2 is provided with a circulation line 4 for circulating the absorption liquid such that the absorption liquid in the distillation column 2 is extracted from a bottom of the distillation column 2 and returned to the inside of the distillation column 2 again. The circulation line 4 is provided with a first reboiler 5*a* which is a heat exchanger that heats the absorption liquid by exchanging heat between the absorption liquid flowing through the circulation line 4 and a heat medium. The heat medium that exchanges heat with the absorption liquid will be described later.

In addition, the distillation column 2 is provided with a condensing device 6 that returns a condensed liquid obtained by cooling a gas (hereinafter, referred to as "outflow gas") flowing out of a top of the distillation column 2 to the distillation column 2. The condensing device 6 includes an outflow gas line 6*a* through which an outflow gas flows, a cooler 6*b* provided in the outflow gas line 6*a*, a recirculation tank 6*c* connected to a downstream-side end portion of the outflow gas line 6*a*, and a condensed liquid line 6*d* that returns the condensed liquid in the recirculation tank 6*c* to the distillation column 2. The cooler 6*b* can be, for example, a heat exchanger that cools the outflow gas by exchanging heat between the outflow gas and any cooling fluid. In addition to the condensed liquid, a gas mainly composed of carbon dioxide is present in the recirculation tank 6*c*. One end of a carbon dioxide supply line 7 connected to a device using carbon dioxide is connected to a top of the recirculation tank 6*c*.

The device using carbon dioxide described above is the methanation device 20 in Embodiment 1. The methanation device 20 includes a reactor 21 to which the other end of the carbon dioxide supply line 7 is connected. As will be described later, the reactor 21 is provided with a catalyst (not shown), and the carbon dioxide and the hydrogen react with each other by the catalytic action to produce methane and water (hereinafter, this reaction is referred to as a "methanation reaction"). A reaction gas flowing out of the reactor 21 includes the produced methane and water, the unreacted carbon dioxide and hydrogen, and other inevitable mixed components. In order to supply hydrogen to the reactor 21, a hydrogen supply line 9 having one end connected to a hydrogen supply source 8 is connected at the other end to the carbon dioxide supply line 7 between the reactor 21 and the recirculation tank 6*c*. The hydrogen supply source 8 is not particularly limited, and may be, for example, a tank for storing hydrogen or any device for producing hydrogen. In addition, a first heat exchanger 22 is provided between the reactor 21 and the recirculation tank 6*c*. The first heat exchanger 22 is used for exchanging heat between a gas flowing into the reactor 21 (which is a gas containing at least carbon dioxide and hydrogen, and hereinafter referred to as "raw material gas") and the reaction gas flowing out of the reactor 21.

A reaction gas supply line 23 for supplying the reaction gas flowing out of the reactor 21 to the first reboiler 5*a* as the heat medium described above is provided to pass through the first heat exchanger 22 such that the reactor 21 and the first reboiler 5*a* communicate with each other. A reaction gas return line 24 that returns the reaction gas serving as the heat medium from the first reboiler 5*a* to the methanation device 20 after the reaction gas is heat-exchanged with the absorption liquid in the first reboiler 5*a* is provided. The reaction gas return line 24 has one end that communicates with the first reboiler 5*a*, and the other end that communicates with a first gas-liquid separator 25 provided in the methanation device 20. The reaction gas return line 24 is provided with a second heat exchanger 26 for cooling the reaction gas by exchanging heat between any cooling medium and the reaction gas.

The methanation device 20 may be provided with a second reaction part 20*b* downstream of a first reaction part 20*a* having the above-described configuration, and at least one reaction part (for example, a third reaction part, a fourth reaction part, and the like) may be provided on a downstream side of the second reaction part 20*b*, although not shown in FIG. 1. For example, the second reaction part 20*b* includes a reactor 21*b* and a first gas-liquid separator 25*b* provided on a downstream side of the reactor 21*b*, as in the first reaction part 20*a*. In addition, the second reaction part 20*b* is provided with a first heat exchanger 22*b* that exchanges heat between the reaction gas from the first reaction part 20*a* and the reaction gas flowing out of the reactor 21*b*, and a second heat exchanger 26*b* that cools the reaction gas before flowing into the first gas-liquid Separator 25*b*. The first reaction part 20*a* and the second reaction part 20*b* are connected to each other by allowing the first gas-liquid separator 25 and the reactor 21*b* to communicate with each through a reaction gas line 27. Even in a case where the third reaction part, the fourth reaction part, and the like are provided, the third reaction part, the fourth reaction part, and the like can be configured to have the same configuration as the second reaction part 20*b*.

Although not an essential configuration in Embodiment 1, a steam supply device 30 for supplying steam to the reaction gas Supply line 23 may be provided. The configuration of the steam supply device 30 is not limited, and for example, a configuration including a steam supply line 32 having one end connected to a steam supply source 31 and the other end connected to the reaction gas supply line 23, and a flow rate adjustment valve 33 provided in the steam supply line 32 may be adopted. The configuration of the steam supply source 31 is not limited, and may be, for example, a boiler.

<Operation of Carbon Dioxide Recovery System According to Embodiment 1 of Present Disclosure>

Next, an operation of the carbon dioxide recovery system 1 according to Embodiment 1 of the present disclosure will be described. The absorption liquid that has absorbed the carbon dioxide flows into the distillation column 2 via the absorption liquid line 3. The absorption liquid in the distillation column 2 circulates such that the absorption liquid line is extracted from the bottom of the distillation column 2 and then flows through the circulation line 4 to return into the distillation column 2. When the absorption liquid circulates in this way, the absorption liquid is heated in the first reboiler 5*a*.

When a temperature of the absorption liquid rises due to heating of the absorption liquid in the first reboiler 5*a*, the carbon dioxide absorbed in the absorption liquid is released from the absorption liquid. The carbon dioxide and other gas components that are released from the absorption liquid ascend inside the distillation column 2 to flow out of the top of the distillation column 2 and then flow through the outflow gas line 6*a* as the outlet gas. When the outflow gas flows through the outflow gas line 6*a*, the outflow gas is cooled in the cooler 6*b*. When a temperature of the outflow gas is lowered by cooling, a component having a low boiling point in the outflow gas is condensed, but most of the carbon dioxide remains in a gaseous state. When the cooled outflow gas flows into the recirculation tank 6*c*, the outflow gas is separated into a gas component and a liquid component. The gas component mainly composed of carbon dioxide is supplied to the methanation device 20 as a raw material through the carbon dioxide supply line 7. Meanwhile, the liquid component is returned into the distillation column 2 via the condensed liquid line 6*d*.

Meanwhile, in the methanation device 20, the carbon dioxide flowing through the carbon dioxide supply line 7 and the hydrogen supplied from the hydrogen supply source 8 via the hydrogen supply line 9 flow into the reactor 21 as the raw material gas after being heated in the first heat exchanger 22. In the reactor 21, a methanation reaction occurs due to the catalytic action, and the methane and the water are produced. The reaction gas flowing out of the reactor 21 flows through the reaction gas supply line 23, is cooled by exchanging heat with the raw material gas in the first heat exchanger 22, and then exchanges heat with the absorption liquid in the first reboiler 5*a*. Thereafter, the reaction gas flows through the reaction gas return line 24, is cooled in the second heat exchanger 26, and is gas-liquid separated into a liquid phase and a gas phase in the first gas-liquid separator 25. The liquid phase is mainly water, and the gas phase contains methane, carbon dioxide, hydrogen, or the like. In addition, when water is used as the cooling medium in the second heat exchanger 26, steam can be obtained by utilizing heat of the reaction gas.

In a case where the methanation device 20 has the second reaction part 20*b* and further has the third reaction part, the fourth reaction part, or the like, in the reactor of each reaction part (in the second reaction part 20*b*, the reactor 21*b*), the carbon dioxide and the hydrogen which are not used in the methanation reaction in the preceding reaction part are consumed by the methanation reaction, and are gas-liquid separated in the gas-liquid separator of each reaction part (in the second reaction part 20*b*, the first gas-liquid separator 25*b*). The higher the number of the reaction parts, the higher the concentration of the methane in the reaction gas flowing out of each reactor.

In this way, the absorption liquid is heated by exchanging heat between the reaction gas flowing out of the reactor 21 for producing methane by causing the carbon dioxide and the hydrogen to react with each other and the absorption liquid that has absorbed the carbon dioxide. Therefore, a thermal efficiency of releasing the carbon dioxide from the absorption liquid can be improved as compared with a case where the heat is exchanged between the steam produced by the heat of the reaction gas and the absorption liquid (for example, PTL 1).

For example, in a case where a production amount of methane in the methanation device 20 is small or in a case where an amount of the absorption liquid flowing into the distillation column 2 is large, there is a possibility that thermal energy for heating the absorption liquid is insufficient with only the reaction gas supplied from the methanation device 20 to the first reboiler 5*a*. In such a case, when the steam supply device 30 is provided, the steam supply device 30 supplies the steam to the reaction gas. Therefore, the thermal energy for heating the absorption liquid in the first reboiler 5*a* can be increased. A supply amount of the steam from the steam supply device 30 can be adjusted by the flow rate adjustment valve 33. In addition, even when the steam is added to the reaction gas, the water is separated from the reaction gas in the first gas-liquid separator 25. Therefore, a quality of the methane as a product of the methanation device 20 is not adversely affected.

Embodiment 2

Next, a carbon dioxide recovery system according to Embodiment 2 will be described. The carbon dioxide recovery system according to Embodiment 2 is different from that of Embodiment 1 in that a second reboiler 5*b* is provided in addition to the first reboiler 5*a*. Further, in Embodiment 2, the same components as those in Embodiment 1 are designated by the same reference signs, and the detailed descriptions thereof will not be repeated.

<Configuration of Carbon Dioxide Recovery System According to Embodiment 2 of Present Disclosure>

Figure 2:
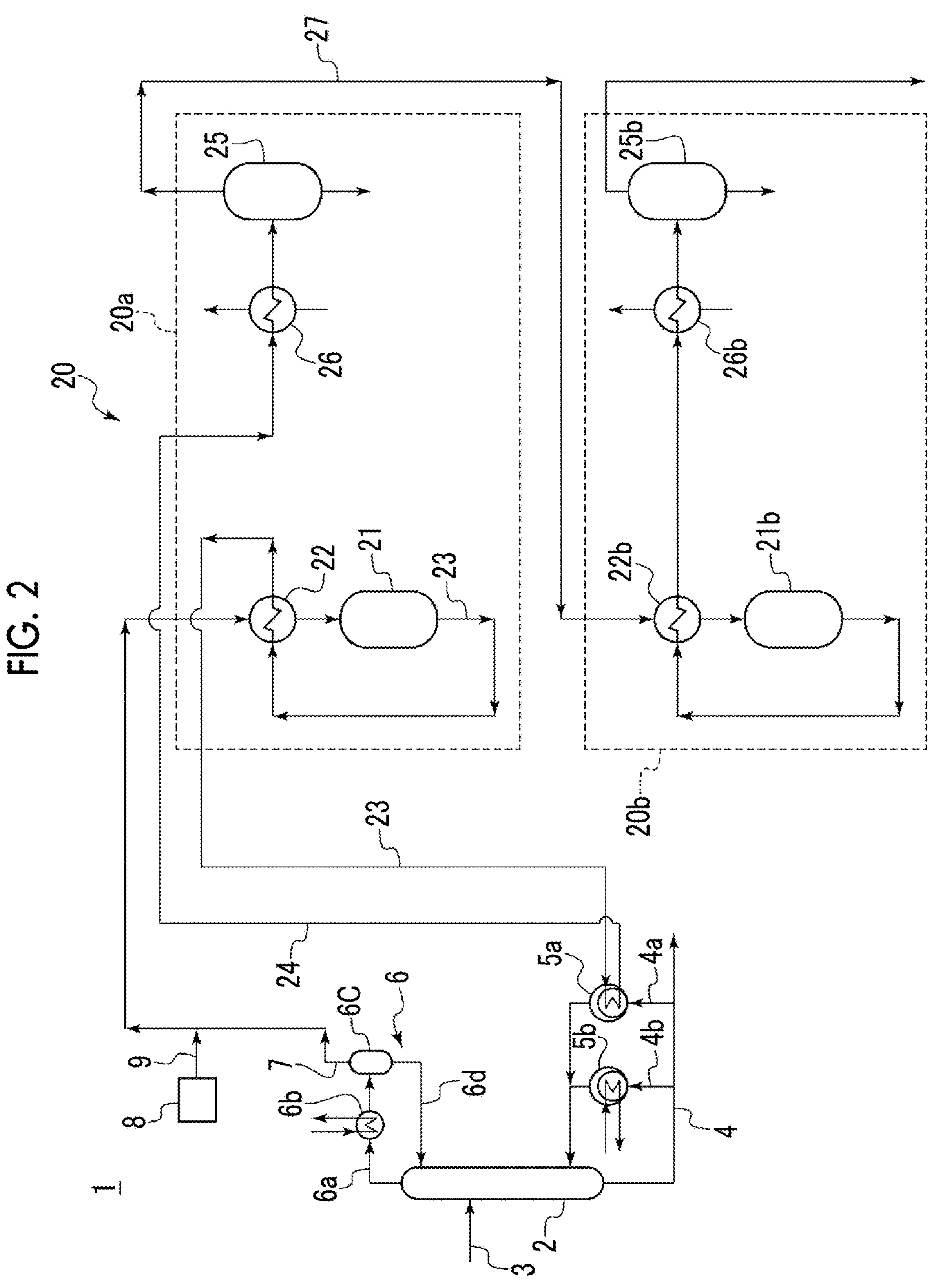
FIG. 2 is a schematic configuration diagram of a carbon dioxide recovery system according to Embodiment 2 of the present disclosure.

As shown in FIG. 2, in the carbon dioxide recovery system 1 according to Embodiment 2 of the present disclosure, the circulation line 4 includes a first line portion 4*a* and a second line portion 4*b*, which are portions where the flow of the absorption liquid is divided into two and the divided absorption liquid flow in parallel to each other. The first reboiler 5*a* and the second reboiler 5*b* are provided in the first line portion 4*a* and the second line portion 4*b*, respectively. The second reboiler 5*b* is a heat exchanger that heats the absorption liquid by exchanging heat between the absorption liquid flowing through the second line portion 4*b* and the steam. The other configurations are the same as those in Embodiment 1.

<Operation of Carbon Dioxide Recovery System According to Embodiment 2 of Present Disclosure>

Next, an operation of the carbon dioxide recovery system 1 according to Embodiment 2 of the present disclosure will be described. An operation of releasing the carbon dioxide from the absorption liquid in the distillation column 2, an operation of producing the methane and the water from the carbon dioxide and the hydrogen in the methanation device 20, and an operation of heating the absorption liquid by using the reaction gas flowing out of the reactor 21 as the heat medium in the first reboiler 5*a* are the same as those in Embodiment 1. Embodiment 2 is different from Embodiment 1 in that the absorption liquid flowing through the second line portion 4*b* in the absorption liquid circulating through the circulation line 4 is heated by exchanging heat with the steam in the second reboiler 5*b*.

In Embodiment 2, from the viewpoint of the reaction gas supplied to the first reboiler 5*a* as the heat medium, effects are obtained in that even in a case where the thermal energy for heating the absorption liquid is insufficient with only the reaction gas, the thermal energy for heating the absorption liquid can be supplemented by the heat exchange with the steam in the second reboiler 5*b*. Meanwhile, from the viewpoint of the steam in the second reboiler 5*b*, effects are obtained in that a use amount of the steam in the second reboiler 5*b* can be reduced by an amount of heat of the reaction gas flowing out of the reactor 21, which is used as the thermal energy for heating the absorption liquid.

Modification Example of Carbon Dioxide Recovery System According to Embodiment 2 of Present Disclosure In Embodiment 2, the first reboiler 5*a* and the second reboiler 5*b* are provided in parallel with each other regarding a flow direction of the absorption liquid, but the present disclosure is not limited to such forms. The first reboiler 5*a* and the second reboiler 5*b* may be provided in series with each other.

Embodiment 3

Next, a carbon dioxide recovery system according to Embodiment 3 will be described. The carbon dioxide recovery system according to Embodiment 3 is changed from Embodiment 1 or 2 such that a plurality of gas-liquid separators are provided in the first reaction part 20*a* of the methanation device 20. In the following description, a form in which the above-mentioned changes are made with respect to Embodiment 1 is referred to as Embodiment 3, but a form in which the above-mentioned changes are made with respect to Embodiment 2 may be referred to as Embodiment 3. Further, in Embodiment 3, the same components as those in Embodiment 1 are designated by the same reference signs, and the detailed descriptions thereof will not be repeated.

<Configuration of Carbon Dioxide Recovery System According to Embodiment 3 of Present Disclosure>

Figure 3:
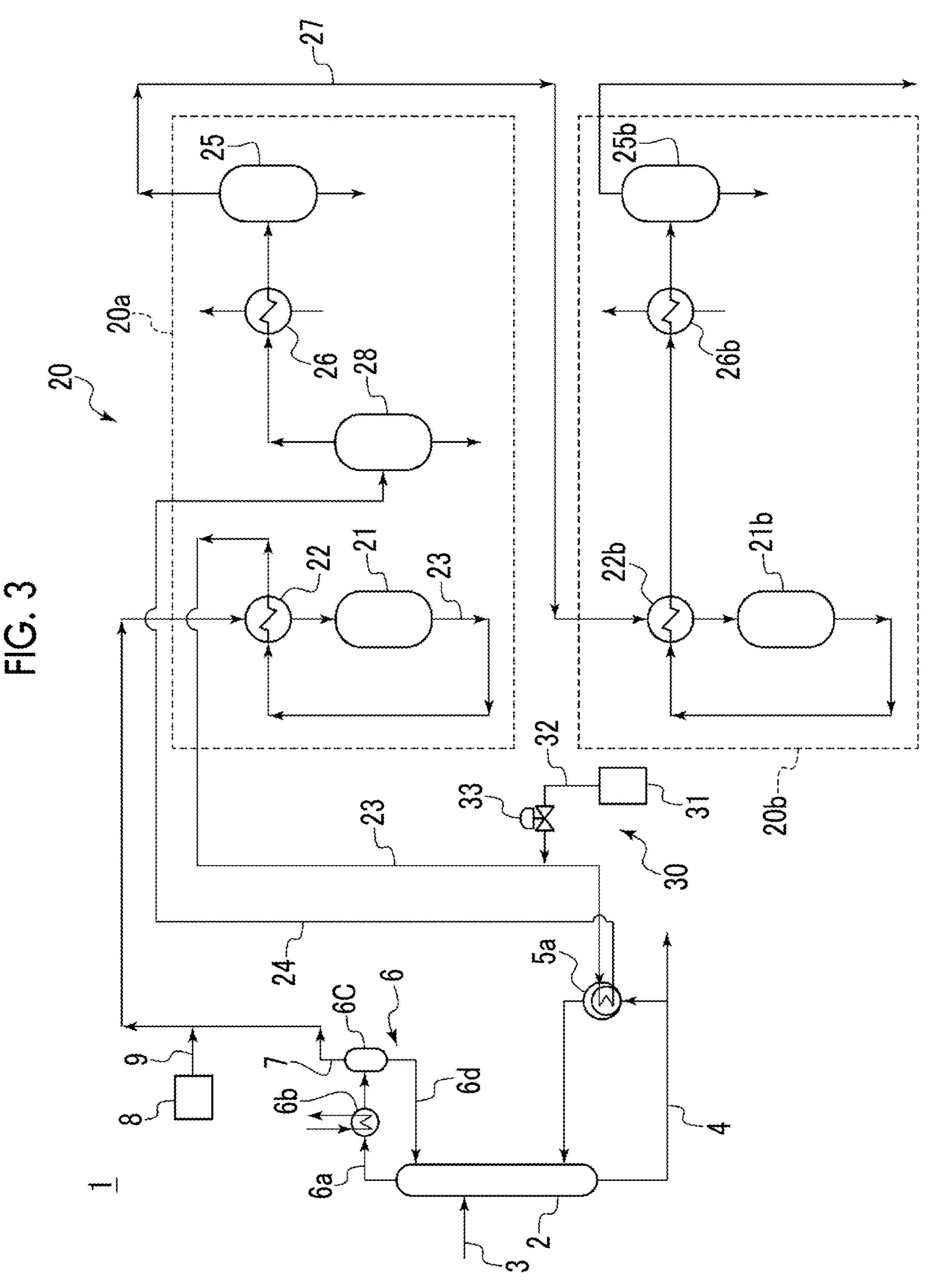
FIG. 3 is a schematic configuration diagram of a carbon dioxide recovery system according to Embodiment 3 of the present disclosure.

As shown in FIG. 3, in the carbon dioxide recovery system 1 according to Embodiment 3 of the present disclosure, a second gas-liquid separator 28 is provided on an upstream side of the second heat exchanger 26 in the reaction gas return line 24. The other configurations are the same as those in Embodiment 1.

<Operation of Carbon Dioxide Recovery System According to Embodiment 3 of Present Disclosure>

Next, an operation of the carbon dioxide recovery system 1 according to Embodiment 3 of the present disclosure will be described. The reaction gas that has exchanged heat with the absorption liquid in the first reboiler 5*a* flows into the second gas-liquid separator 28 when flowing through the reaction gas return line 24, and is gas-liquid separated into a gas phase and a liquid phase in the second gas-liquid separator 28. The gas phase flows out of the second gas-liquid separator 28, is cooled by the second heat exchanger 26 as in Embodiment 1, and then is gas-liquid separated by the first gas-liquid separator 25. Other operations are the same as those in Embodiment 1.

In Embodiment 3, the liquid phase is separated from the reaction gas also in the second gas-liquid separator 28. Since a temperature of the liquid phase separated by the second gas-liquid separator 28 is higher than a temperature of the liquid phase separated by the first gas-liquid separator 25, for example, when the liquid phase separated by the second gas-liquid separator 28 is heated to be converted into steam, the steam can be produced and used with less energy compared with a case where the liquid phase separated by the first gas-liquid separator 25 is heated to be converted into steam. Accordingly, the thermal efficiency of the entire carbon dioxide recovery system 1 can be improved.

Embodiment 4

Next, a carbon dioxide recovery system according to Embodiment 4 will be described. The carbon dioxide recovery system according to Embodiment 4 is obtained by adding a bypass line for a part of the reaction gas to bypass the first reboiler 5*a* to Embodiment 1 or 2. In the following description, a form in which the bypass line is added to Embodiment 1 is referred to as Embodiment 4, but a form in which the bypass line is added to Embodiment 2 may be referred to as Embodiment 4. Further, in Embodiment 4, the same components as those in Embodiment 1 are designated by the same reference signs, and the detailed descriptions thereof will not be repeated.

<Configuration of Carbon Dioxide Recovery System According to Embodiment 4 of Present Disclosure>

Figure 4:
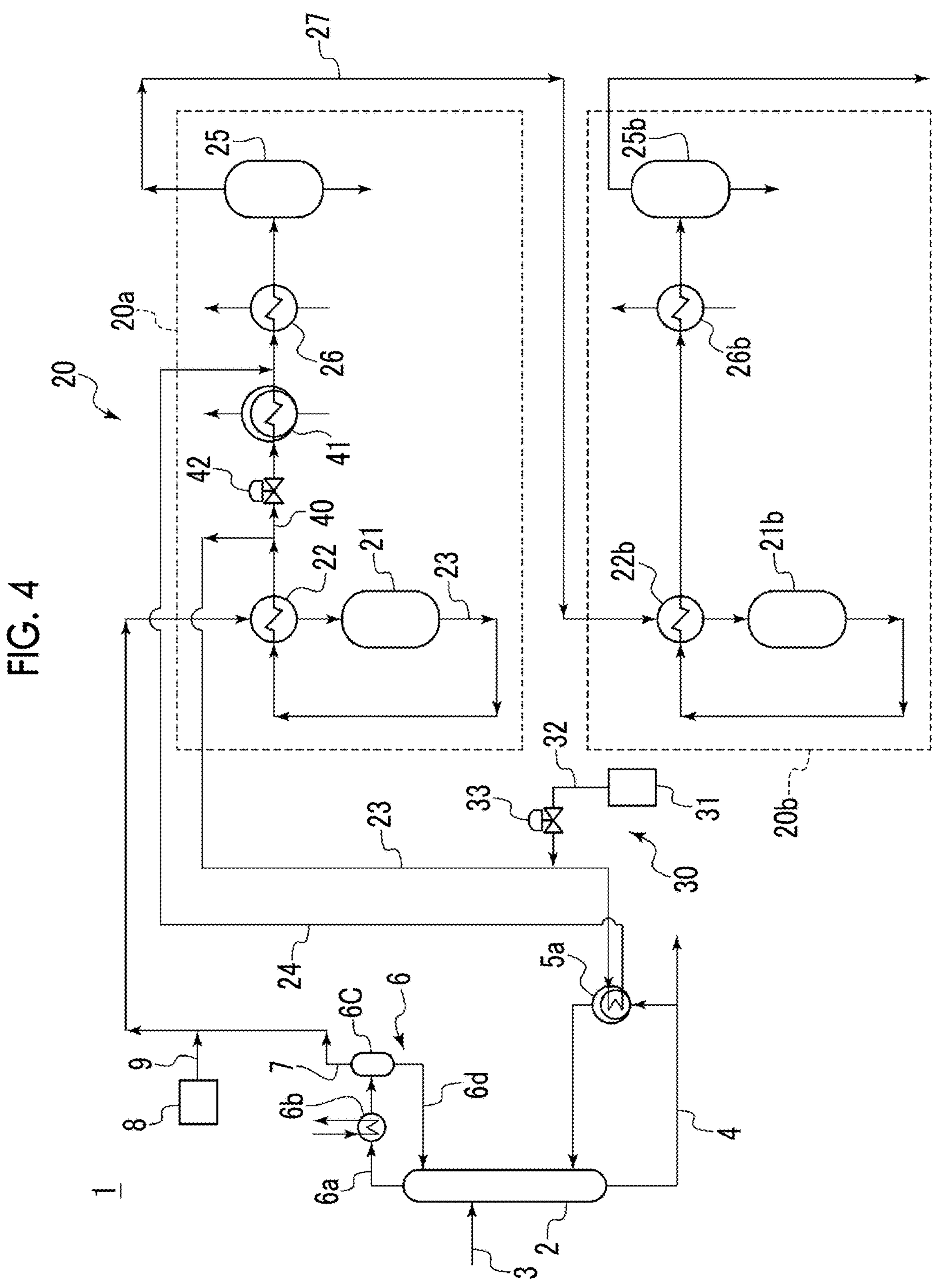
FIG. 4 is a schematic configuration diagram of a carbon dioxide recovery system according to Embodiment 4 of the present disclosure.

As shown in FIG. 4, the carbon dioxide recovery system 1 according to Embodiment 4 of the present disclosure is provided with a bypass line 40 for a part of the reaction gas flowing out of the reactor 21 to bypass the first reboiler 5*a*. One end (upstream-side end portion) of the bypass line 40 is connected to the reaction gas supply line 23 between the reactor 21 and the first reboiler 5*a*, preferably between the first heat exchanger 22 and the first reboiler 5*a*. The other end (downstream-side end portion) of the bypass line 40 is connected to the reaction gas return line 24 between the first reboiler 5*a* and the first gas-liquid separator 25, preferably between the first reboiler 5*a* and the second heat exchanger 26.

The bypass line 40 is provided with a third heat exchanger 41 that cools the reaction gas by exchanging heat between the reaction gas flowing through the bypass line 40 and the cooling medium, and a flow rate adjustment valve 42 that adjusts a flow rate of the reaction gas flowing through the bypass line 40. It is preferable that the cooling medium that exchanges heat with the reaction gas in the third heat exchanger 41 contains water, and it is more preferable that the cooling medium is water. The other configurations are the same as those in Embodiment 1.

<Operation of Carbon Dioxide Recovery System According to Embodiment 4 of Present Disclosure>

Next, an operation of the carbon dioxide recovery system 1 according to Embodiment 4 of the present disclosure will be described. A part of the reaction gas flowing out of the reactor 21 flows through the bypass line 40 by adjusting an opening degree of the flow rate adjustment valve 42. That is, a part of the reaction gas flowing out of the reactor 21 can be prevented from being supplied to the first reboiler 5*a*. In a case where the reaction gas flowing out of the reactor 21 has a sufficient amount of heat for heating the absorption liquid in the first reboiler 5*a*, the thermal efficiency of the entire carbon dioxide recovery system 1 can be improved by adjusting the flow rate of the reaction gas flowing through the bypass line 40 by using the flow rate adjustment valve 42 in consideration of an amount of heat required in the distillation column 2 and an amount of heat generated in the methanation device 20.

The reaction gas flowing through the bypass line 40 is cooled by exchanging heat with the cooling medium in the third heat exchanger 41. In this case, when water is used as the cooling medium, steam can be obtained by utilizing the heat of the reaction gas. The reaction gas flowing out of the third heat exchanger 41 merges with the reaction gas flowing through the reaction gas return line 24, and then is cooled by the second heat exchanger 26 as in Embodiment 1. Thereafter, the reaction gas is gas-liquid separated by the first gas-liquid separator 25. Other operations are the same as those in Embodiment 1.

Modification Example of Carbon Dioxide Recovery System According to Embodiments 1 to 4 of Present Disclosure In Embodiments 1 to 4, only the reaction gas flowing out of the reactor 21 is used for heating the absorption liquid. However, the present disclosure is not limited to this form. A plurality of the first reboilers 5*a* may be provided in the circulation line 4, and the reaction gas flowing out of the reactor 21*b* of the second reaction part 20*b* or the reaction gas flowing out of the reactor of the third reaction part, the fourth reaction part, or the like may be supplied to each of the first reboilers 5*a* to exchange heat with the absorption liquid.

In Embodiment 1 to 4, the carbon dioxide from the recirculation tank 6*c* is supplied to the reactor 21 as a raw material for the methanation reaction in the methanation device 20. However, the present disclosure is not limited to this form. The carbon dioxide from the recirculation tank 6*c* may be consumed by a device different from the methanation device 20, and the carbon dioxide from another device, for example, a carbon dioxide storage cylinder or a device that produces carbon dioxide (hereinafter, referred to as a "carbon dioxide supply source"), may be supplied to the reactor 21. In addition, the carbon dioxide may be supplied from each of the carbon dioxide supply source and the recirculation tank 6*c* to the reactor 21. That is, the carbon dioxide from the recirculation tank 6*c* may be used as a part of the raw material of the methanation reaction.

Fifth Embodiment

Next, a carbon dioxide recovery system according to Embodiment 5 will be described. The carbon dioxide recovery system according to Embodiment 5 is different from the carbon dioxide recovery systems according to Embodiments 1 to 4 in that the liquid phase separated in the first gas-liquid separator 25 is used. Further, in Embodiment 5, the same components as those in Embodiments 1 to 4 are designated by the same reference signs, and the detailed descriptions thereof will not be repeated.

<Configuration of Carbon Dioxide Recovery System According to Embodiment 5 of Present Disclosure>

Figure 5:
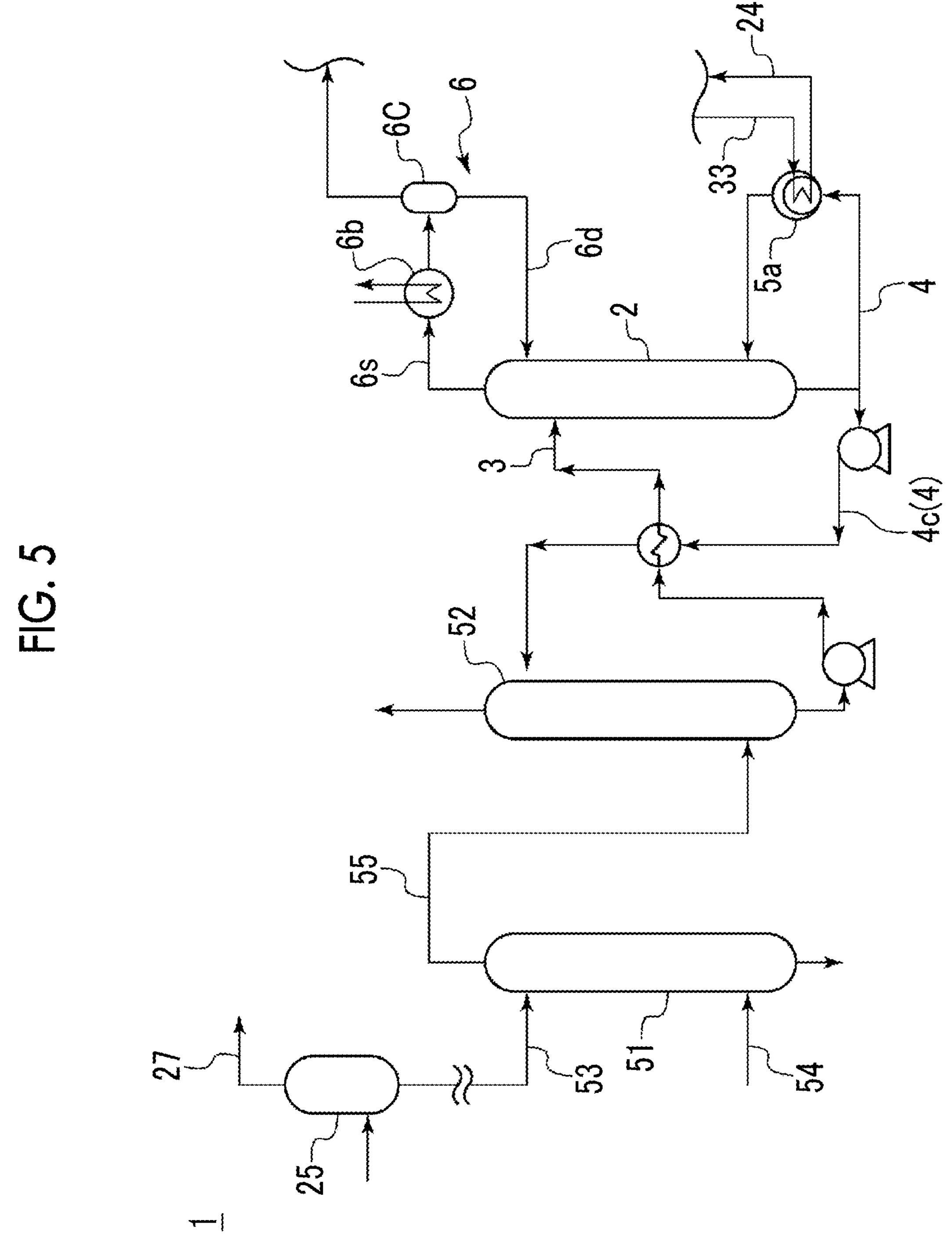
FIG. 5 is a schematic configuration diagram of a carbon dioxide recovery system according to Embodiment 5 of the present disclosure.

As shown in FIG. 5, the carbon dioxide recovery system 1 according to Embodiment 5 of the present disclosure includes a first column 51 in which a gas containing carbon dioxide and a fluid containing water are brought into gas-liquid contact with each other, and a second column 52 in which the gas flowing out of the first column 51 and the absorption liquid are brought into gas-liquid contact with each other. A line 54 through which the gas containing the carbon dioxide flows is connected to the first column 51. The first column 51 and the second column 52 communicate with each other via a line 55. The second column 52 and the distillation column 2 communicate with each other via the absorption liquid line 3. The circulation line 4 includes a branch line 4*c* that branches off on an upstream side of the first reboiler 5*a*, and the branch line 4*c* is connected to the second column 52. The first gas-liquid separator 25 and the first column 51 communicate with each other via a water supply line 53. The water supply line 53 may communicate with the second column 52 instead of the first column 51, or may communicate with both the first column 51 and the second column 52. Other configurations are omitted in FIG. 5, but are the same as those in Embodiments 1 to 4.

<Operation of Carbon Dioxide Recovery System According to Embodiment 5 of Present Disclosure>

Next, an operation of the carbon dioxide recovery system 1 according to Embodiment 5 of the present disclosure will be described. In Embodiment 5, an operation until the absorption liquid that has absorbed the carbon dioxide flows into the distillation column 2 is different from the operation of Embodiment 1 or 2, and the other operations are the same as the operations of Embodiment 1 or 2. Therefore, hereinafter, only the operation until the absorption liquid that has absorbed the carbon dioxide flows into the distillation column 2 will be described.

A gas containing carbon dioxide, for example, an exhaust gas discharged from various combustion devices flows into the first column 51 via the line 54 and ascends inside the first column 51. In addition, the liquid phase in the first gas-liquid separator 25, that is, the water is supplied to the first column 51 via the water supply line 53 and falls inside the first column 51. In the first column 51, the gas containing the carbon dioxide and the water come into gas-liquid contact with each other so that solid matters such as sulfur oxide (for example, sulfur dioxide) and dust contained in the gas are absorbed and captured by the water to be removed, and at the same time, cooled.

The gas flowing out of a top of the first column 51 flows into the second column 52 via the line 55 and ascends inside the second column 52. In the second column 52, the absorption liquid extracted from a bottom of the second column 52 is sent to the distillation column 2 via the absorption liquid line 3, and the absorption liquid extracted from the bottom of the distillation column 2 is sent to the second column 52 via the branch line 4*c*, so that the absorption liquid circulates between the second column 52 and the distillation column 2. The gas and the absorption liquid come into gas-liquid contact with each other in the second column 52, so that the carbon dioxide in the gas is absorbed by the absorption liquid, the concentration of the carbon dioxide in the gas is reduced, and the gas is released from a top of the second column 52.

In this way, the water separated from the reaction gas by the first gas-liquid separator 25 of the methanation device 20 is used for cooling and washing the gas containing the carbon dioxide so that the consumption of the water in the carbon dioxide recovery system 1 can be reduced.

Modification Example of Carbon Dioxide Recovery System According to Embodiment 5 of Present Disclosure In Embodiment 5, only the liquid phase separated by the first gas-liquid separator 25 is supplied to the first column 51. However, the present disclosure is not limited to this form. The liquid phase separated by the first gas-liquid separator 25*b* of the second reaction part 20*b* or the liquid phase separated by the gas-liquid separator of the third reaction part, the fourth reaction part, and the like may also be supplied to the first column 51. In addition, the present disclosure is not limited to a form in which only the liquid phase of the gas-liquid separator of the methanation device 20 is supplied to the first column 51. Only a part of the liquid phase of the gas-liquid separator of the methanation device 20 may be used or water from another water supply source may be supplied to the first column 51. In addition, in Embodiment 5, the liquid phase separated by the first gas-liquid separator 25 is directly supplied to the first column 51. However, the liquid phase may be supplied to the first column 51, the second column 52, or both of the first column 51 and the second column 52 after being cooled to a temperature required in the first column 51. A method using a heat exchanger or any other optional method can be used as a cooling method.

The contents described in each embodiment are understood as follows, for example.

[1] A carbon dioxide recovery system according to one aspect includes: the distillation column (2) that heats the absorption liquid that has absorbed carbon dioxide to release the carbon dioxide from the absorption liquid; the first reboiler (5*a*) that exchanges heat between the absorption liquid extracted from the distillation column (2) and the heat medium; the methanation device (20) including the reactor (21) that produces methane by causing the carbon dioxide and hydrogen to react with each other; the reaction gas supply line (23) that supplies the reaction gas flowing out of the reactor (21) to the first reboiler (5*a*) as the heat medium; and the reaction gas return line (24) that returns the reaction gas, which has exchanged heat with the absorption liquid in the first reboiler (5*a*), to the methanation device (20).

According to the carbon dioxide recovery system of the present disclosure, the absorption liquid is heated by exchanging heat between the reaction gas flowing out of the reactor that produces methane by causing carbon dioxide and hydrogen to react with each other and the absorption liquid that has absorbed the carbon dioxide. Therefore, it is possible to improve the thermal efficiency of releasing the carbon dioxide from the absorption liquid.

[2] The carbon dioxide recovery system according to another aspect is the carbon dioxide recovery system of [1], further including the second reboiler (5*b*) that exchanges heat between the absorption liquid extracted from the distillation column (2) and steam.

According to such a configuration, even in a case where the thermal energy for heating the absorption liquid is insufficient with only the reaction gas supplied from the methanation device to the first reboiler, the thermal energy for heating the absorption liquid can be supplemented by the heat exchange with the steam in the second reboiler. In addition, the use amount of the steam in the second reboiler can be reduced by the amount of heat of the reaction gas supplied from the methanation device to the first reboiler, which is used as the thermal energy for heating the absorption liquid.

[3] The carbon dioxide recovery system according to still another aspect is the carbon dioxide recovery system of [1], further including the steam supply device (30) that supplies steam to the reaction gas supply line (23).

According to such a configuration, in a case where the thermal energy for heating the absorption liquid is insufficient with only the reaction gas supplied from the methanation device to the first reboiler, the steam is supplied to the reaction gas by the steam supply device. Therefore, the thermal energy for heating the absorption liquid in the first reboiler can be increased.

[4] The carbon dioxide recovery system according to still another aspect is the carbon dioxide recovery system according to any one of [1] to [3], in which the methanation device (20) includes the first heat exchanger (22) that exchanges heat between the reaction gas flowing through the reaction gas supply line (23) and the carbon dioxide and the hydrogen before flowing into the reactor (21).

According to such a configuration, the heat of the reaction gas is used not only for heating the absorption liquid in the first reboiler, but also for heating the carbon dioxide and the hydrogen before flowing into the reactor. Therefore, the thermal efficiency of the entire carbon dioxide recovery system can be improved.

[5] The carbon dioxide recovery system according to still another aspect is the carbon dioxide recovery system according to any one of [1] to [4], in which the methanation device (20) includes at least one gas-liquid separator (first gas-liquid separator 25, second gas-liquid separator 28) that gas-liquid separates the reaction gas, and the carbon dioxide recovery system (1) further includes the first column (51) that causes a gas containing carbon dioxide and water to come into gas-liquid contact with each other, the second column (52) that causes a gas flowing out of the first column (51) and the absorption liquid to come into gas-liquid contact with each other, the absorption liquid line (3) that supplies the absorption liquid from the second column (52) to the distillation column (2), and the water supply line (53) that supplies a liquid phase separated by the at least one gas-liquid separator (25, 28) to the first column (51) as the water.

According to such a configuration, the water separated from the reaction gas by the gas-liquid separator of the methanation device is used for cooling and washing the gas containing the carbon dioxide so that the consumption of the water in the carbon dioxide recovery system can be reduced.

[6] The carbon dioxide recovery system according to still another aspect is the carbon dioxide recovery system of [5], in which the methanation device (20) includes two or more gas-liquid separators (25, 28).

In a case where a temperature of the liquid phase separated by one gas-liquid separator is higher than a temperature of the liquid phase separated by the other gas-liquid separator, when the liquid phase having a higher temperature is heated to be converted into steam, the steam can be produced and used with less energy compared with a case where the liquid phase having a lower temperature is heated to be converted into steam. Accordingly, the thermal efficiency of the entire carbon dioxide recovery system can be improved.

[7] The carbon dioxide recovery system according to still another aspect is the carbon dioxide recovery system according to any one of [1] to [5], in which the methanation device (20) includes the bypass line (40) for at least a part of the reaction gas to bypass the first reboiler (5*a*).

According to such a configuration, in a case where the reaction gas flowing out of the reactor has a sufficient amount of heat for heating the absorption liquid in the first reboiler, the thermal efficiency of the entire carbon dioxide recovery system can be improved by adjusting the flow rate of the reaction gas flowing through the bypass line in consideration of an amount of heat required in the distillation column and an amount of heat generated in the methanation device.

[8] The carbon dioxide recovery system according to still another aspect is the carbon dioxide recovery system of [7], in which the methanation device (20) includes the gas-liquid separator (25) to which the reaction gas return line (24) is connected, and the bypass line (40) is connected to the reaction gas return line (24) between the first reboiler (5*a*) and the gas-liquid separator (25).

According to such a configuration, the entire reaction gas flowing out of the reactor can be separated into the liquid phase and the gas phase by the gas-liquid separator.

[9] The carbon dioxide recovery system according to still another aspect is the carbon dioxide recovery system of [7] or [8], in which the methanation device (20) includes the second heat exchanger (26) that cools a gas in which the reaction gas having flowed through the reaction gas return line (24) and the reaction gas having flowed through the bypass line (40) are merged.

According to such a configuration, the steam can be obtained by utilizing the heat of the reaction gas by exchanging heat between the reaction gas and the water as the cooling medium in the second heat exchanger.

[10] The carbon dioxide recovery system according to still another aspect is the carbon dioxide recovery system according to any one of [7] to [9], in which the third heat exchanger (41) that recovers heat of the reaction gas flowing through the bypass line (40) is provided in the bypass line (40).

According to such a configuration, the steam can be obtained by utilizing the heat of the reaction gas by exchanging heat between the reaction gas flowing through the bypass line and the water as the cooling medium in the third heat exchanger.

[11] The carbon dioxide recovery system according to still another aspect is the carbon dioxide recovery system of [10], in which the cooling medium that exchanges heat with the reaction gas in the third heat exchanger (41) includes water.

According to such a configuration, the steam can be obtained by utilizing the heat of the reaction gas by exchanging heat between the reaction gas flowing through the bypass line and the water as the cooling medium in the third heat exchanger.

[12] The carbon dioxide recovery system according to still another aspect is the carbon dioxide recovery system according to any one of [1] to [11], further including: the carbon dioxide supply line (7) that supplies the carbon dioxide released from the distillation column (2) to the reactor (21).

According to such a configuration, since the recovered carbon dioxide is used as at least a part of the raw material of methane, the carbon dioxide can be effectively utilized.

REFERENCE SIGNS LIST

1: carbon dioxide recovery system
2: distillation column

3: absorption liquid line
5*a*: first reboiler
5*b*: second reboiler
7: carbon dioxide supply line
20: methanation device
21: reactor
22: first heat exchanger
23: reaction gas supply line
24: reaction gas return line
25: first gas-liquid separator (gas-liquid separator)
26: second heat exchanger
28: second gas-liquid separator (gas-liquid separator)
30: steam supply device
40: bypass line
41: third heat exchanger
51: first column
52: second column
53: water supply line

The invention claimed is:

1. A carbon dioxide recovery system comprising:
a distillation column that heats an absorption liquid that has absorbed carbon dioxide to release the carbon dioxide from the absorption liquid;
a first reboiler that exchanges heat between the absorption liquid extracted from the distillation column and a heat medium;
a methanation device including a reactor that produces methane by causing the carbon dioxide and hydrogen to react with each other;
a reaction gas supply line that supplies a reaction gas flowing out of the reactor to the first reboiler as the heat medium; and
a reaction gas return line that returns the reaction gas, which has exchanged heat with the absorption liquid in the first reboiler, to the methanation device.

2. The carbon dioxide recovery system according to claim 1, further comprising:
a second reboiler that exchanges heat between the absorption liquid extracted from the distillation column and steam.

3. The carbon dioxide recovery system according to claim 1, further comprising:
a steam supply device that supplies steam to the reaction gas supply line.

4. The carbon dioxide recovery system according to claim 1, wherein the methanation device includes a first heat exchanger that exchanges heat between the reaction gas flowing through the reaction gas supply line and the carbon dioxide and the hydrogen before flowing into the reactor.

5. The carbon dioxide recovery system according to claim 1, wherein
the methanation device includes at least one gas-liquid separator that gas-liquid separates the reaction gas, and
the carbon dioxide recovery system further comprises:
a first column that causes a gas containing carbon dioxide and water to come into gas-liquid contact with each other;
a second column that causes a gas flowing out of the first column and the absorption liquid to come into gas-liquid contact with each other;
an absorption liquid line that supplies the absorption liquid from the second column to the distillation column; and
a water supply line that supplies a liquid phase separated by the at least one gas-liquid separator to the first column as the water.

6. The carbon dioxide recovery system according to claim 5, wherein the methanation device includes two or more gas-liquid separators.

7. The carbon dioxide recovery system according to claim 1, wherein the methanation device includes a bypass line for at least a part of the reaction gas to bypass the first reboiler.

8. The carbon dioxide recovery system according to claim 7, wherein
the methanation device includes a gas-liquid separator to which the reaction gas return line is connected, and
the bypass line is connected to the reaction gas return line between the first reboiler and the gas-liquid separator.

9. The carbon dioxide recovery system according to claim 7, wherein the methanation device includes a second heat exchanger that cools a gas in which the reaction gas having flowed through the reaction gas return line and the reaction gas having flowed through the bypass line are merged.

10. The carbon dioxide recovery system according to claim 7, wherein a third heat exchanger that recovers heat of the reaction gas flowing through the bypass line is provided in the bypass line.

11. The carbon dioxide recovery system according to claim 10, wherein a cooling medium that exchanges heat with the reaction gas in the third heat exchanger contains water.

12. The carbon dioxide recovery system according to claim 1, further comprising:
a carbon dioxide supply line that supplies the carbon dioxide released from the distillation column to the reactor.

* * * * *